(12) United States Patent
Schulze Wehninck et al.

(10) Patent No.: US 11,524,651 B2
(45) Date of Patent: Dec. 13, 2022

(54) AIRBAG COVER

(71) Applicant: K.L. KASCHIER—UND LAMINIER GMBH, Bad Bentheim-Gildehaus (DE)

(72) Inventors: Rembert Schulze Wehninck, Tutzing (DE); Albert Roring, Gronau-Epe (DE)

(73) Assignee: K.L. KASCHIER-UND LAMINIER GMBH, Bad Bentheim-Gildehaus (DE)

( * ) Notice: Subject to any disclaimer, the term of this patent is extended or adjusted under 35 U.S.C. 154(b) by 0 days.

(21) Appl. No.: 16/642,808

(22) PCT Filed: May 17, 2019

(86) PCT No.: PCT/EP2019/000152
§ 371 (c)(1),
(2) Date: Feb. 27, 2020

(87) PCT Pub. No.: WO2020/038595
PCT Pub. Date: Feb. 27, 2020

(65) Prior Publication Data
US 2021/0170981 A1 Jun. 10, 2021

(30) Foreign Application Priority Data
Aug. 24, 2018 (DE) .......................... 102018006702.6

(51) Int. Cl.
*B60R 21/2165* (2011.01)

(52) U.S. Cl.
CPC ................................ *B60R 21/2165* (2013.01)

(58) Field of Classification Search
CPC .................. B60R 21/2165; B60R 2021/21512
See application file for complete search history.

(56) References Cited

U.S. PATENT DOCUMENTS

| | | | |
|---|---|---|---|
| 6,089,642 A | 7/2000 | Davis, Jr. et al. | |
| 7,552,940 B2 | 6/2009 | Lindemann | |
| 8,870,217 B2 * | 10/2014 | Kim ....................... | B60R 21/215 |
| | | | 280/728.3 |
| 9,352,716 B2 * | 5/2016 | Liu ........................ | B60R 21/215 |
| 9,421,936 B2 * | 8/2016 | Sugawara ......... | B29C 66/81431 |
| 9,598,039 B2 | 3/2017 | Knauf | |
| 10,220,807 B2 * | 3/2019 | Mazzocchi ........... | B60R 21/215 |
| 2005/0140121 A1 | 6/2005 | Hayashi et al. | |

(Continued)

FOREIGN PATENT DOCUMENTS

| | | | | |
|---|---|---|---|---|
| DE | 102010012136 A | | 9/2011 | |
| DE | 102012109350 A | | 8/2014 | |
| DE | 102018006703 A1 * | 2/2020 | ........... B60R 21/215 |

(Continued)

*Primary Examiner* — Nicole T Verley
(74) *Attorney, Agent, or Firm* — Andrew Wilford

(57) ABSTRACT

The invention relates to a cover for closing a mouth of a receptacle holding an airbag with at least one airbag flap, wherein the cover has at least one breakaway line at the edge of the airbag flap(s) in order to enable the unfolding of the airbag, and wherein the airbag flap(s) is/are connected via a hinge element to a flap support wall in a molded manner, which is in contact with the inner surface of the receptacle wall in particular in a secured manner, wherein the flap support wall runs around the inner surface of the receptacle wall such that at least the four corners of the receptacle near the airbag flap(s) are covered.

5 Claims, 1 Drawing Sheet

(56) References Cited

U.S. PATENT DOCUMENTS

2014/0117649 A1\* 5/2014 Hoeing ................. B60R 21/215
                                                          280/728.3
2019/0225179 A1\* 7/2019 Nogaret ................ B60R 21/217

FOREIGN PATENT DOCUMENTS

| DE | 102018006706 | A1 | \* | 2/2020 | ........... B60R 21/215 |
|----|--------------|----|---|--------|------------------------|
| EP | 3345794 | A1 | \* | 7/2018 | ........... B60R 21/215 |
| EP | 3514020 | A1 | \* | 7/2019 | ........... B60R 21/217 |
| EP | 3730354 | A1 | \* | 10/2020 | ........... B60R 21/215 |
| FR | 3007348 | A1 | \* | 12/2014 | ............ B29C 45/14 |
| WO | WO-2013030473 | A1 | \* | 3/2013 | ............ B60K 37/00 |

\* cited by examiner

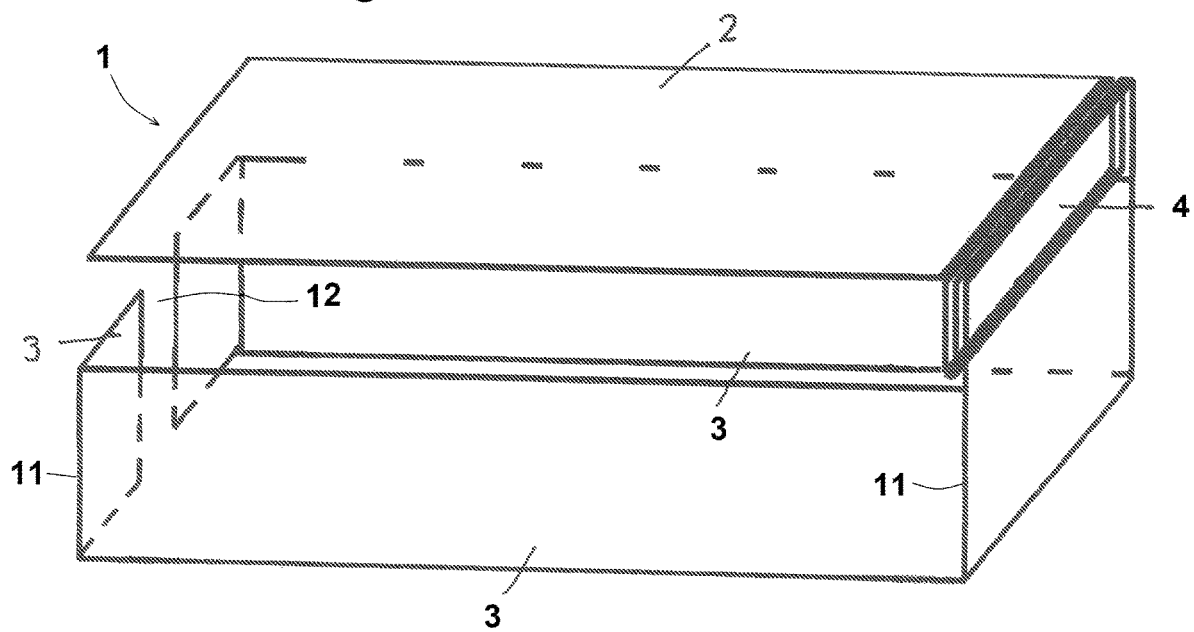
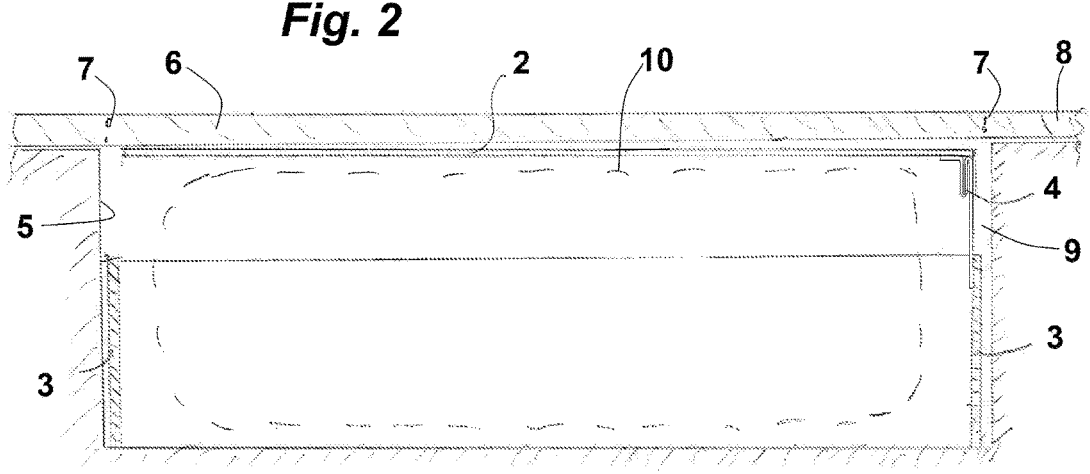

AIRBAG COVER

CROSS REFERENCE TO RELATED APPLICATIONS

This application is the US-national stage of PCT application PCT/EP2019/000152 filed 17 May 2019 and claiming the priority of German patent application 102018006702.6 itself filed 24 Aug. 2018.

FIELD OF THE INVENTION

The invention relates to a cover assembly for a mouth of a receptacle holding an airbag with at least one airbag flap.

BACKGROUND OF THE INVENTION

In such a cover assembly the cover has at least one breakaway line at the edge of the airbag flap(s) in order to enable the unfolding of the airbag, and wherein the airbag flap(s) is/are connected via a hinge to a flap support wall in a molded manner, which flap support wall is in contact with the inner surface of the receptacle wall in particular in a secured manner.

Such a cover assembly is known from EP 2 727 775 [US 2014/0117649]. In the case of these cover assemblies, it has been shown that the receptacle accommodating the airbag is not always sufficiently durable. This is in particular the case in places where the plastic parts meet in plastic injection molding.

OBJECT OF THE INVENTION

The object of the invention is to improve a cover assembly of the above-mentioned type such that the receptacle is reinforced without increasing its weight.

SUMMARY OF THE INVENTION

According to the invention, this object is achieved in that the flap support wall runs around the inner surface of the receptacle wall such that at least the four corners of the receptacle near the airbag flap(s) are covered.

In this manner, the flap support wall forms a reinforcement of the region of the receptacle near the airbag flap(s). The receptacle wall and the hinge of the airbag flap(s) are reinforced, and the places where the plastic parts meet in injection molding are also secured.

It is preferably proposed for the flap support wall to form a peripheral frame on whose longitudinal frame side(s) the airbag flap(s) is/are connected via the hinge. It is also possible for the airbag flap(s) and/or the flap support wall to have a material reservoir in the form of a fold in the region of the hinge. Furthermore, the reinforcement is increased by fixing the flap support wall to the inner surface of the receptacle wall.

A large exit opening is ensured for the airbag if the surface area of one airbag flap or two airbag flaps corresponds to the area of the mouth of the receptacle.

Particularly high resistance is achieved if the airbag flap(s) and the flap support wall are composed of a composite material having at least one layer comprising plastic strips or fibers, in particular composed of thermoplastic polypropylene or polyester, and at least one plastic layer melted thereon. The plastic strips or fibers can form a fabric.

The assembly of the cover is facilitated if the lower edge of at least one longitudinal frame side of the flap support wall has mounting tabs. Furthermore, the cover is usually covered by an outer cover layer composed of a plastic foam material and an outer skin.

BRIEF DESCRIPTION OF THE DRAWING

An embodiment of the cover assembly according to the invention is shown in the attached drawing in which:

FIG. 1 is a perspective view in the drawing; and
FIG. 2 is a vertical section through the instant invention as shown in FIG. 1.

SPECIFIC DESCRIPTION OF THE INVENTION

The cover assembly 1 according to the invention is used in an airbag unit of a motor vehicle having a vehicle interior trim or instrument panel having a receptacle mouth through can pass the airbag of the unit. The airbag unit has a receptacle 9 accommodating the airbag (cushion) 10 and having an upper opening closed by the cover assembly 1 that has one or two airbag flaps 2 that span the mouth of the receptacle 9. If only one airbag flap 2 is used, the outer dimensions of the airbag flap correspond to the surface dimensions of the upper mouth of the receptacle 9. If two airbag half flaps 2 are provided, the outer dimensions of each corresponds to half the area of the upper mouth of the receptacle 9.

The longitudinal side of the one or two airbag flap(s) 2 is articulated to a flap support wall 3 via a hinge 4, and the flap support wall 3 surrounds the mouth of the receptacle 9. In this case, the flap support wall 3 surrounds the mouth as a closed frame, or the flap support wall 3 runs along the inner surface of the receptacle wall such that at least the four corners 11 of the receptacle near the airbag flap(s) 2 are covered. In the latter case, a longitudinal side of the flap support wall 3 forms a gap 12.

The hinge 4 between the flap support wall 3 and airbag flap(s) 2 is molded on the airbag flap(s) 2 and the flap support wall 3 such that the airbag flap(s) 2, hinge 4 and flap support wall 3 are formed from a single plastic part that is produced in a plastic injection molding process. In this case, the hinge 4 forms a fold (as shown, for example, by EP 2 727 775) as a material reservoir such that the flap(s) 2 can move outward to a limited extent.

The flap support wall 3 is in contact with the inner surface 5 of the receptacle 9 and is preferably fixed thereto.

The airbag flap(s) 2, the flap support wall 3 and the hinge 4 are composed of a composite material having at least one layer composed of plastic strips and/or fibers, in particular made of thermoplastic polypropylene or polyester, and at least one plastic layer melted thereon. In this case, the plastic bands or fibers can form a fabric.

The lower edge of the flap support wall 3 is formed with unillustrated mounting tabs spaced at regular intervals, and the cover assembly 1 is covered by an outer cover layer composed of a plastic foam material and an outer skin.

FIG. 2 further shows, as seen in US 2014/0117649, that the receptacle 9 is normally closed by a surface layer 8 formed with break lines 7 defining a section 6 of the layer 8 that can break away on sudden expansion of the cushion 10 on deployment of the airbag.

The invention claimed is:
1. A cover assembly for closing a mouth of a receptacle holding an airbag and defined by four inner surfaces meeting at corners, the cover assembly comprising:
at least one airbag flap, at least one breakaway line at an edge of the airbag flap enabling unfolding of the airbag, and a molded flap support wall having a pair of opposite ends and contacting the inner surfaces of the receptacle, the flap support wall extending continuously from one of the ends to the other of the ends around the inner surfaces of the receptacle wall to brace and covering the four corners of the receptacle near the airbag flap; and a hinge connecting the airbag flap to an edge of one of the surfaces of the wall, the ends of the support wall being spaced apart by a gap opposite the hinge.

2. The cover assembly according to claim 1, wherein the flap support wall forms a peripheral frame passing continuously around the corners and to whose longitudinal frame side the airbag flap is connected via the hinge.

3. The cover assembly according to either claim 1, wherein the airbag flap or the flap support wall has a material reservoir in the form of a fold in the region of the hinge extending a length of the airbag flap outward.

4. The cover assembly according to claim 1, wherein the flap support wall is fixed to the inner surface of the receptacle wall.

5. The cover assembly according to claim 1, wherein a surface area of airbag flap corresponds to an area of the mouth of the receptacle.

\* \* \* \* \*